(12) United States Patent
Josefiak et al.

(10) Patent No.: US 9,014,978 B2
(45) Date of Patent: Apr. 21, 2015

(54) UPGRADING LOCATION-RELATED DATA

(71) Applicants: Frank Josefiak, Bonn Bad Godesberg (DE); Filip Petkov, Cologne (DE)

(72) Inventors: Frank Josefiak, Bonn Bad Godesberg (DE); Filip Petkov, Cologne (DE)

(73) Assignee: Deutsche Post AG, Bonn (DE)

( * ) Notice: Subject to any disclaimer, the term of this patent is extended or adjusted under 35 U.S.C. 154(b) by 18 days.

(21) Appl. No.: 13/945,297

(22) Filed: Jul. 18, 2013

(65) Prior Publication Data

US 2014/0025297 A1    Jan. 23, 2014

(30) Foreign Application Priority Data

Jul. 19, 2012 (EP) .................................... 12177124

(51) Int. Cl.

| | |
|---|---|
| G01C 21/34 | (2006.01) |
| G06F 17/30 | (2006.01) |
| G08G 1/01 | (2006.01) |
| G06Q 10/04 | (2012.01) |
| G06Q 50/30 | (2012.01) |
| H04W 4/02 | (2009.01) |
| H04L 29/08 | (2006.01) |

(52) U.S. Cl.
CPC ........ *G01C 21/3461* (2013.01); *G06F 17/3087* (2013.01); *H04W 4/021* (2013.01); *H04L 67/18* (2013.01); *G08G 1/0112* (2013.01); *G06Q 10/047* (2013.01); *G06Q 50/30* (2013.01)

(58) Field of Classification Search
CPC . G06F 17/30214; G06F 17/3087; G08G 1/00; G08G 1/0112; H04W 4/021; G04L 67/18; G01C 21/3461; G06Q 10/047; G06Q 50/30

USPC .................................................. 701/533, 450
See application file for complete search history.

(56) References Cited

U.S. PATENT DOCUMENTS

| | | | |
|---|---|---|---|
| 6,871,137 | B2 | 3/2005 | Scaer et al. |
| 8,090,523 | B2 | 1/2012 | Takeuchi et al. |
| 2006/0158330 | A1 | 7/2006 | Gueziec |
| 2008/0033644 | A1 | 2/2008 | Bannon |
| 2008/0071465 | A1 | 3/2008 | Chapman et al. |
| 2009/0005968 | A1* | 1/2009 | Vengroff et al. .............. 701/202 |
| 2010/0094548 | A1 | 4/2010 | Tadman et al. |

FOREIGN PATENT DOCUMENTS

| | | |
|---|---|---|
| CA | 2 597 210 A1 | 2/2009 |
| EP | 1767902 A1 | 3/2007 |

* cited by examiner

*Primary Examiner* — Mary Cheung
*Assistant Examiner* — Yuen Wong
(74) *Attorney, Agent, or Firm* — Reinhart Boerner Van Deuren P.C.

(57) ABSTRACT

For a more efficient utilization of data that are relevant to safety and/or mobility, data are read from a plurality of data sources. The data of each data source sets of coordinates of real locations relevant for a respective aspect can be determined. Based on a respective set of coordinates for each of the real locations a respective area is then defined for each of the data sources, and a value assigned to the area is determined. Overlapping areas defined for a respective data source are aggregated so as to obtain non-overlapping areas with at least one assigned value for each of the data sources. The non-overlapping areas are superposed with the assigned values. The result is a value distribution, which reflects an overall situation with regard to the at least two aspects in a real region. An apparatus, a system, a program and a storage medium are configured accordingly.

27 Claims, 7 Drawing Sheets

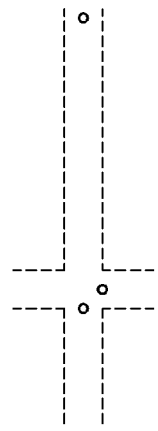
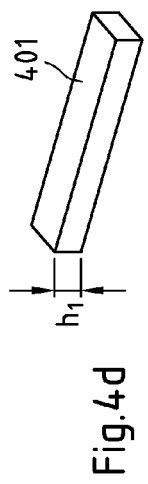
Fig.5a  Fig.5b  Fig.5c  Fig.5d
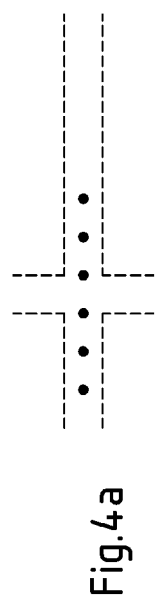
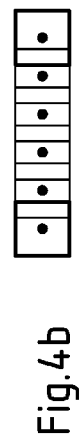
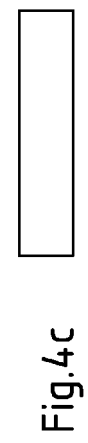
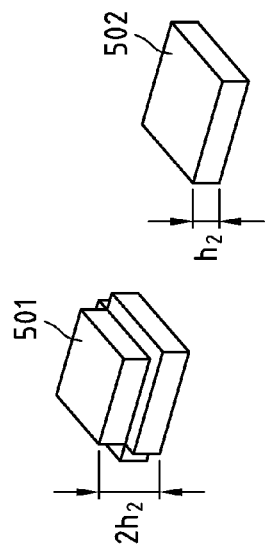
Fig.4a  Fig.4b  Fig.4c  Fig.4d

UPGRADING LOCATION-RELATED DATA

CROSS-REFERENCE TO RELATED PATENT APPLICATIONS

This patent application claims priority to European Patent Application No. 12177124.0, filed Jul. 19, 2012, the entire teachings and disclosure of which are incorporated herein by reference thereto.

FIELD OF THE INVENTION

The present invention concerns, inter alia, a method, an apparatus, a system, a program, and a storage medium, for upgrading location-related data.

BACKGROUND OF THE INVENTION

Location-related data can relate to various aspects, for example aspects that are relevant to safety and/or mobility, but also other diverse aspects. Location-related data relevant to safety and mobility enable a user to assess the situation in an area, or along a section of route.

Various items of specific safety-relevant information are freely available. The British police, for example, place items of information concerning crimes on the Internet. By means of access to this information it is possible to cause an indication of the locations at which a murder, a robbery, or another crime has taken place on a map on a display.

Similar information exists in the USA, for example, for the places of residence of sex offenders, so as to allow those seeking accommodation to select a supposedly safe environment. Google also provides first safety-relevant information in the form of POIs (points of interest), for example information relating to flooding and the scenes of fires.

In addition data sources are known that provide congestion alerts or information relating to sections of road at risk of traffic congestion.

Data relating to various aspects are usually provided by different providers via different data sources.

SUMMARY OF THE INVENTION

The invention is based on the reflection that information from a single data source may be insufficient for a user to be able to assess a situation as comprehensively as desired. If, for example, the route for a transport of valuables is being planned, then in addition to an optimal distance and an optimal time of delivery it is not only important that minimal stoppage times are to be anticipated along the route, but also, for example, that the risks of a hijacking or an accident are also minimized. In another exemplary situation a user may be planning to purchase a house in a certain area. He is then very likely to be interested not only in the number and distribution of any sex offenders living in the vicinity, but also, for example, in the number and distribution of burglaries, thefts or murders, and/or accident black spots on the children's route to nursery.

The invention is furthermore based on the reflection that with each further data source and each further supplier of such data sources, not only the analysis options and synergies, but also the evaluation complexity increases significantly, rapidly making any manual evaluation impractical, if not impossible.

The invention is furthermore based on the reflection that knowledge of a multiplicity of punctiform relevant locations is not very suitable for providing a user with a clear overview of a situation, or enabling an efficient automatic evaluation of the situation.

The object of the invention is therefore to provide an option for utilizing data from a plurality of data sources in a more efficient manner.

The object is achieved by means of a method according to Claim 1, an apparatus according to Claim 14, a system according to Claim 15, a program according to Claim 16, and a storage medium. Further forms of embodiment are to be found in the dependent claims.

An exemplary method according to the invention comprises, realized by at least one apparatus, a reading of data from at least two data sources, wherein, on the basis of the data of each of the at least two data sources, sets of coordinates can be determined for real locations relevant to a particular aspect. The method furthermore comprises a definition of a respective area based on a respective set of coordinates for each of the real locations for each of the at least two data sources, and a determination of at least one value assigned to the respective area. The method furthermore comprises an aggregation of overlapping areas defined for a respective data source so as to obtain non-overlapping areas with at least one assigned value for each of the at least two data sources. The method furthermore comprises a superposition of the non-overlapping areas with the assigned values, which are based on the data from the at least two data sources, so as to obtain a value distribution that reflects an overall situation with regard to the at least two aspects in a real region.

The invention thus envisages for certain exemplary embodiments that an apparatus can read data from a plurality of data sources that provide data relating to various aspects. The data comprise a respective set of coordinates for various relevant real locations, or allow the determination of such sets of coordinates. An area with at least one assigned value can then firstly be defined for each set of coordinates and thus for each relevant location. Here each area represents a real area in a real region. The at least one value that is assigned to an area is to be understood to be a quantitative value and can for example represent the (original) relevance or importance of the area for a certain aspect. Here the term "value" can, for example, for reasons of clarity, be deemed to be the height of the area. If a plurality of values is assigned to an area as at least one value, then the area has differing values at differing locations.

If real locations, for which areas have been defined for a certain data source, are located close together, the defined areas can overlap one another. The overlapping areas are aggregated separately for each data source, so that for each data source a set of non-overlapping areas is available, which areas in total cover the same parts of the real region as did previously the totality of the defined areas. That is to say, the result is that for each data source a maximum of one area and one value is assigned to each possible position in the real region. It is furthermore to be understood that for other purposes a plurality of areas and/or a plurality of values can be assigned to certain positions.

The non-overlapping areas with assigned values for various data sources are then superposed. The resultant value distribution reflects an overall view of the situation. With the value distribution an overall value can be assigned to each position in the real region, wherein the overall value can ensue from any form of aggregation of the values of the individual data sources for this position. Examples for such an aggregation include a summation of weighted or non-weighted values of the individual data sources for a respective position, wherein the summation can optionally be subjected to further constraints, such as, for example, an allowed maximum value for the overall value. The value distribution can, for example, comprise only one overall value for all data sources for a respective position. Alternatively it can comprise, for example, individual data values for each data source, and one overall value, for a respective position. As a further alternative they can comprise for a respective position for example, cumulative individual values for each data source, so that the last individual value at the same time corresponds to an overall value, etc. Larger overall values could then, for example, point to districts afflicted with a greater disadvantage. Alternatively however, larger overall values could also, for example, similarly point to districts that are particularly advantageous.

After the reading of the data the processing can be executed by one or a plurality of apparatuses, which optionally comprise the reading apparatus.

A possible advantage of the invention lies in the fact that it can deliver a good overview of a situation in a region with regard to selected aspects, which overview can neither be achieved with a manual evaluation of various data sources, nor with a simple superposition of points on a map. The definition of areas and values for each set of coordinates can moreover be used for the purpose of obtaining a uniform data format for all data sources, even if the data read in from the various data sources initially have different formats. The initially separate processing of the areas for each data source enables, moreover, a particularly flexible processing of the read data.

An exemplary apparatus according to the invention comprises means for performing the method according to the invention. The apparatus is, for example, a data-processing apparatus, for example a server or a terminal.

An exemplary apparatus according to the invention comprises for example at least one processor and at least one memory, wherein a program comprising program instructions is stored in the memory, and wherein the memory and the program are configured, together with the processor, to at least cause the apparatus to perform the method according to the invention, when the program is executed on the processor. The apparatus is, for example, configured in terms of software so as to be able to perform the method. Here the phrase "configured in terms of software" is to be understood in particular to mean the preparation of the apparatus that is necessary in order to be able to perform a method for example in the form of a program on the processor.

Here the term "processor" is to be understood to mean, among other things, one or a plurality of control units, microprocessors, microcontrol units such as microcontrollers, digital signal processors (DSPs), application-specific integrated circuits (ASICs), or field programmable gate arrays (FPGAs), A memory is, for example, a program memory, and/or a main memory of the processor, and/or a database, and/or a cache. The term "program memory" is to be understood to mean, inter alia, a non-volatile memory and the term "main memory" is to be understood to mean a volatile or a non-volatile memory, in particular a memory with random access (RAM) and/or a flash memory. Non-volatile memories are e.g. memories with random access (RAM) such as e.g. NOR flash memories, or with sequential access such as e.g. NAND flash memories, and/or memories with read-only access (ROM) such as e.g. EPROM-, EEPROM-, or ROM-memories. The memory can for example be designed in an objective manner.

An exemplary system according to the invention comprises at least two apparatuses with means for the joint performance of the method according to the invention. In an alternative system according to the invention, the system comprises one apparatus according to the invention and at least one data source.

An exemplary program according to the invention comprises program instructions, wherein the program instructions cause an apparatus to perform the method according to the invention, when the program is executed by the processor. A program can for example be distributed over a network, such as a local network, a wide area network, a virtual network, a wireless network such as a mobile communications network, another form of telephone network, and/or the Internet. A program can at least partially be the software and/or firmware of a processor. For example, the program according to the invention is stored in a memory of the apparatus according to the invention.

An exemplary storage medium according to the invention stores the program according to the invention. The storage medium is, for example, a computer-readable storage medium that contains the program according to the invention and is, for example, designed as a magnetic, electrical, electromagnetic, optical, and/or other type of storage medium. The storage medium can be, in particular, a physical and/or objective storage medium. The storage medium is, for example, portable, or permanently installed in an apparatus. The term "computer-readable" is in particular to be understood to mean that the storage medium can be read out, and/or written to, by a computer or a data processing device, for example a processor. The storage medium is, for example, a program memory of a processor.

In an exemplary embodiment, the area defined for a respective set of coordinates for at least one of the data sources is a square. A quadratic form enables a particularly simple definition of an area and a particularly simple aggregation of overlapping areas. A square can, for example, be defined in terms of its four corner points and the edges connecting these corner points. The orientation of the square can be set. Other relatively simple to define shapes, such as a circular shape or a polygon are also possible. In principle, however, any geometric shape can be used. However, some shapes, at least in the case of a multitude of overlapping areas to be aggregated into one non-overlapping area, can lead to a very complex definition and thus to a very high computing effort.

In an exemplary embodiment, for at least one of the data sources a respective area is defined for each set of coordinates, which area has a hole around the location defined by the set of coordinates. It is to be understood that such holes can also have any shape.

Moreover, for different data sources different shapes could also be used. It would even be possible to provide different shapes for one data source.

In an exemplary embodiment the size and/or the at least one value of the area defined for a respective set of coordinates has at least one prescribed value for at least one of the data sources. This enables a particularly simple definition of the areas, or a particularly simple determination of the assigned value, respectively. For at least one of the data sources, the size of the area and/or the at least one value assigned to the area can, however, also totally or partially depend on the data read in from the particular data source.

The size of the area can, for example, be set such that for a certain aspect it is deemed to be generally sufficient. For example, for a data source with information concerning murders the area could cover a radius of 200 m around the respective site of crime, and for a data source with information relating to terrorist attacks the area could cover a radius of 1 km around the location of the respective attack. For a data source with information concerning petrol stations the area could, for example, cover a radius of 23 km around the petrol station, etc. The size of the areas could, however, also be set to have the same value for all data sources. As a further alternative the size of an area could, for example, be selected such that it extends to the respective next road junctions. However, this requires more computing effort than the utilization of one or a plurality of set quantities, and also the additional consideration of road information at the very start of the processing.

The same or different values can be assigned to various areas for a data source. For the assignation of different values additional information could be assigned to each set of coordinates from the data source, and read in with the latter. For example for a data source which provides traffic congestion information a first relatively low value could be assigned to the areas relating to the coordinates for normal traffic congestion, and a very high value could be assigned to the areas relating to the coordinates for a blocked section of road which indicates that a region cannot be accessed or driven through. Furthermore, for example, for a data source that provides flooding information a value could be assigned to the areas that corresponds to the particular height of the floodwater. Furthermore, for example, for a data source that provides information regarding different forms of crime, a higher value could be assigned for murder than for theft, etc. In addition, not only can an individual uniform value be assigned to an area defined for a respective set of coordinates, but also values varying over the area can be assigned to the latter. If the area is, for example, arranged around a location defined by the set of coordinates, the value can reduce continuously or in stages with the distance from the central point, etc. In the case of a data source that provides traffic congestion data, this may take account of the assumption, for example, that it can be the more advantageous the further one remains distant from the center of the traffic congestion. Vice versa, in particular in the case of an area with a hole, the at least one value could also comprise a multitude of values, which are assigned to the area such that with increasing distance from a location defined by the set of coordinates they increase at least up to a maximum value continuously or in stages. In the case of a data source that delivers information relating to a particular type of facility, this allows for example taking account of the assumption that it can be the more advantageous the shorter the distance that is maintained from such a facility.

In an exemplary embodiment, a point in time is assigned to at least one of the sets of coordinates that can be determined from the data of at least one of the data sources. The size of the area and/or the value assigned to the area for the at least one set of coordinates can then also be determined as a function of the point in time specified for this set of coordinates. For example, for coordinates with assigned earlier points in time, smaller areas and/or lower values can be provided, so that earlier data have a smaller influence on the value distribution. In this manner, the principal alterations in a region can be taken into account. For example an alteration in routing and configuration of roads or an increase in speed control could lead to a situation in which the accident rate at a junction is reduced and in which a high number of earlier accidents is less significant. In a similar manner enhanced safety measures, better illumination, more police checks or a newly installed video monitoring on a road could result in a significant reduction of the number of hijackings on a road so that a high number of earlier hijackings is less significant.

In summary the assignment of values to areas and/or the size of areas for an individual data source can thus take place as required whilst taking into account at least one of at least four different parameters: the up-to-date nature of the data, the frequency of incidents, the significance of incidents or states, and the distance from a location defined by a set of coordinates. Here an aggregated consideration of a plurality of these parameters for an individual data source is possible. In the case of traffic congestion data, for example, current traffic congestion incidents can be evaluated as a function of the severity of the congestion, which can ensue from duration, length, and bypass options, historical traffic congestion data can be added with a lower weighting, and in addition the distance can be taken into account in both cases.

In an exemplary embodiment in the course of the aggregation of the areas for at least one data source a uniform value that is constant over the particular area is assigned to all non-overlapping areas. In particular this comes into consideration if a single equal value has already been assigned to all areas for the data source defined on the basis of the coordinates. Such a data source can for example be a data source that provides information relating to a current state, such as, for example, the availability or non-availability of a certain service.

If, however, different values are assigned to differing areas for a data source, or if a plurality of values is assigned to a respective area, these differences can also be taken into account in the course of the aggregation of the areas. In the course of the aggregation of the areas into non-overlapping areas, for each point, for example, the highest value—or depending upon the definition the lowest value—of the original areas could be used for this purpose at this point.

In a further exemplary embodiment in the course of the aggregation of the areas for at least one of the data sources the values assigned to the defined areas in the overlapping portions are cumulated, for example by summation of the values for a particular position. Such a data source can, for example, be a data source that provides information that is based on a longer time period, such as, for example, information relating to accidents or crimes. By the cumulative aggregation it can be achieved that a plurality of events of the same type that are very close to one another can be assigned a higher significance than an individual event in a particular region. Thus it can be assumed that at a junction with many registered accidents the risk of an accident is greater than at a junction at which only a single accident has been registered so far. Likewise it can be assumed that on a road with a plurality of registered hijackings the risk of a hijacking is greater than on a road with a single registered hijacking, etc. Here the same value can always have been assigned to the original areas for a data source, or different values can have been assigned in order to discern the level of importance. In some embodiments the values can be normalized before any further processing. Thus after a summation for all overlapping areas the values for a particular data source could have been mapped to a uniform scale of 0 to 1, or to any other scale. By this means excessive differences, both between the values of one data source and also between the values of different data sources, can be avoided.

If on the other hand in an exemplary embodiment the area for each set of coordinates for a data source is defined such that it has a hole around the location defined by the set of coordinates, then the aggregation for this data source can result in a single non-overlapping area with holes around all locations defined by the sets of coordinates. Such a data source can be, for example, a data source that specifies the coordinates of particular facilities, such as those of petrol stations, restorers, etc. For example, for the transport of works of art it can be specified by an insurance company that at each point of the route it must be possible to reach a restorer within a certain time period. The exemplary embodiment then allows a route to be selected such that it always passes through the holes and thus a restorer can generally be reached within the specified time period.

The initially separate processing of the data for each data source enables, for example, a variable weighting of the data sources depending upon their relevance in various situations.

In an exemplary embodiment the method includes a registration of a user input, which specifies a weighting for the at least two data sources, and a use of the specified weightings for purposes of adjusting the influence of the at least two data sources on the value distribution. This can offer the advantage that a user can himself determine what significance various types of data have for his purposes. For the transport of high-value goods, for example, the bypassing of regions subject to many hijackings can be 2.5 times as important as the avoidance of traffic congestion.

The use of the specified weightings for purposes of adjusting the influence of the at least two data sources on the value distribution can be implemented in various ways. In an exemplary embodiment a weighting of the values assigned to the non-overlapping areas takes place for each of the at least two data sources in accordance with the specified weightings before the superposition of the non-overlapping areas. In an alternative exemplary embodiment, already a determination of the values of the defined areas for each of the at least two data sources takes place taking into account the specified weightings.

In an exemplary embodiment a storage of data relating to the non-overlapping areas and of the assigned values takes place in addition for at least one of the data sources as a basis for repeated superposition. By this means the resources necessary for the computation of this data can be reduced. This can concern both the processing power and also, in the case of distributed processing on a plurality of apparatuses, the quantity of data to be transferred. In addition the use of stored data can significantly reduce the time until a result is available. Also the effort required to generate the data can be reduced this way in exemplary embodiments.

In an exemplary embodiment the method furthermore comprises a presentation of a three-dimensional profile illustrating the value distribution by means of a display unit, or a presentation of a three-dimensional profile illustrating the value distribution together with a road network by means of a display unit, and/or a provision of the value distribution for a route analysis, and/or an execution of route computations taking into account the value distribution. If a three-dimensional profile is presented to a user the above-cited normalization of values can have the effect that the presentation becomes easier to understand. If the three-dimensional profile is presented with each data source having its own layer, then the normalization can also make it easier for the user to compare the differences within the individual layers. Also the presentation as such can be simplified by means of the normalization since in this manner the maximum absolute value of the height of the layers can be predetermined. For example, a layer for crimes could always have a height "1" on a map at the location with the highest crime rate.

The aspects to which the data from the data sources relate can be of a very wide variety. Examples are safety-relevant aspects, mobility-relevant aspects, service-relevant aspects, etc. Possible aspects include—in a non-comprehensive list—traffic congestion, accidents, crime, terror attacks, high water, flooding, air pollution, areas on fire, earthquake risk domains, unevenness of ground, gradients or other topographical circumstances, facilities such as petrol stations, and also services with area coverage, such as wireless coverage for traffic information, DVB-T, mobile service in general, mobile service with high data rates, etc.

In an exemplary embodiment the at least two data sources comprise a data source, which provides data, from which sets of coordinates can be determined relating to locations with reference to at least one type of event or incident, and/or a data source, which provides data, from which sets of coordinates can be determined relating to locations with reference to at least one type of local circumstance, and/or a data source, which provides data, from which sets of coordinates can be determined relating to locations of at least one type of local situation, and/or a data source, which provides data, from which sets of coordinates can be determined relating to a certain type of facility.

The data sources can, for example, be databases or web services, and make stored information available in any data format.

Any features of the embodiments presented can be deployed on their own or in combination also for the upgrading of read data, which come from a single data source.

Further advantageous exemplary embodiments of the invention can be taken from the following detailed description of some exemplary embodiments of the present invention, in particular in conjunction with the figures. The figures should however only serve the purpose of clarification, not the purpose of determining the scope of protection of the invention. The figures are not drawn to scale and shall just reflect the general concept of the present invention in an exemplary manner. In particular features that are contained in the figures should by no means be deemed to be an absolutely necessary component of the present invention.

BRIEF DESCRIPTION OF THE DRAWINGS

In the figures:

FIGS. 4a-d is a schematic representation of an aggregation of areas of a first data source;

FIGS. 5a-d is a schematic representation of an aggregation of areas of a second data source;

DETAILED DESCRIPTION OF SOME EXEMPLARY EMBODIMENTS OF THE INVENTION

In what follows the present invention is described on the basis of exemplary embodiments.

Figure 1:
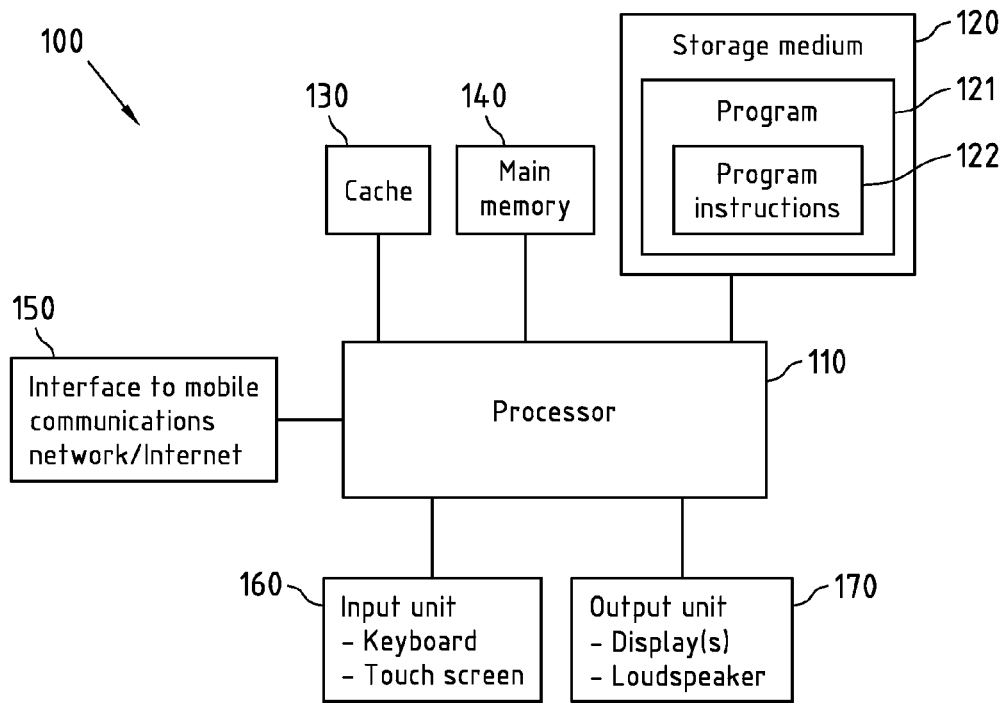
FIG. 1 is a block diagram of an exemplary embodiment of an apparatus according to the invention.

FIG. 1 is a block diagram of an exemplary embodiment of an apparatus 100 according to the invention.

The apparatus 100 comprises by way of example a processor 110 and a storage medium 120 that is linked to the processor 110. The storage medium 120 stores a program 121 with program instructions 122. The processor 110 is configured to execute programs from the storage medium 120 and thereby to cause an apparatus to perform certain actions. The program 121 is a program for upgrading location information. Other programs can, for example, include a program for route computations.

Optionally the apparatus 100 also includes a buffer (cache) 130, a main memory 140, an interface 150, an input unit 160 and/or an output unit 170, wherein each of these components can be linked to the processor 110.

The main memory 140 can store any data, for example map material for route computations.

The interface 150 can be an interface to a mobile communications network, and/or to the Internet, and/or to a local network, or to another component, which enables a connection to a mobile communications network, and/or to the Internet, and/or to a local network.

The input unit 160 can, for example, comprise a keyboard, a touch screen and/or a microphone. Alternatively or additionally any other means can be provided in order to detect an input of a user.

The output unit 170 can, for example, comprise a display, and/or a loudspeaker. Alternatively or additionally any other means can be provided in order to present information to a user.

The apparatus 100 can optionally include any further components.

The apparatus 100 can, for example, be a user terminal, such as a navigation device, a mobile phone or a personal computer (PC), or a server. However, the apparatus 100 can also be a module for a user terminal or a server.

Figure 2:
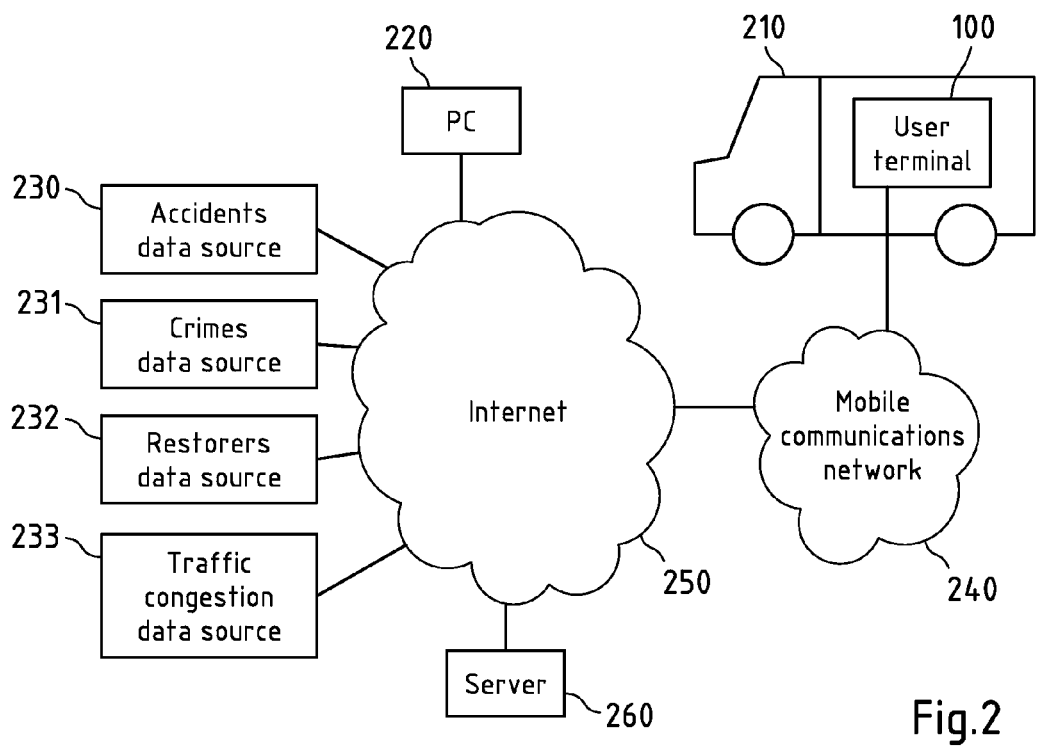
FIG. 2 is a block diagram of an exemplary system with an apparatus in accordance with FIG. 1.

FIG. 2 is a block diagram of an exemplary system, which can include an apparatus 100 in accordance with FIG. 1 as one component.

In FIG. 2, the apparatus 100 is, by way of example, a user terminal that is integrated in a vehicle 210.

Alternatively the represented PC 220 could comprise the apparatus 100 as a module.

The system furthermore includes a plurality of data sources, in particular data sources external to the apparatus 100. By way of example, a data source 230 with location information regarding accidents, a data source 231 with location information regarding crimes, a data source 232 with location information regarding restorers, and a data source 233 with location information regarding traffic congestion, are shown. The system can alternatively or additionally comprise any other data sources. Each of the data sources can for example be a memory with corresponding data, or a server with an integrated memory with corresponding data, or a server with access to an external memory with corresponding data.

The apparatus 100 can access the Internet 250 via a mobile communications network 240 and thereby each of the data sources 230-233. In this case the interface 150 includes a mobile communication unit, or an access to a mobile communication unit otherwise present in the vehicle 210.

If the PC 220 includes an apparatus 100 in accordance with FIG. 1, the PC 220 could also access each of the data sources 230-233 directly via the Internet 250.

Finally the system includes a server 260, which in certain embodiments can undertake some of the functions of the apparatus 100.

FIGS. 3a-3d illustrate an operation of the apparatus 100 in accordance with an exemplary example of embodiment of a method according to the invention.

When the processor 110 executes the program 121 for upgrading location information, the user is firstly informed about possible data sources and is prompted to select any number of data sources (action 301). At the same time, or at a later point in time, the user is prompted to perform a weighting of the selected sources depending upon current interests (action 302). For each selected data source a value could, for example, be selected between 0% for non-relevant data, and 100% for particularly relevant data.

Alternatively a weighting can also be requested directly for all the data sources that are available. All data sources that have been provided with a weigh greater than 0% could then be deemed to have been selected.

The possible data sources and the corresponding access data can for example have been stored in advance by the user. This information can, however, also be part of the program 121, or can be offered by a server that coordinates access to the data sources.

For each of the selected data sources the processor 110 then causes a reading in of data via the interface 150. On the basis of the data read in from each of the data sources sets of coordinates of real locations relevant for a particular aspect can be determined. It can be all of the data provided by the particular data source, or a limited selection of the data, e.g. data for a certain region, and/or only location-related data, in cases where the data source provides further data. A set of coordinates can, for example, include the geographic length and the geographic width of a location. If the read data already comprise coordinates, these only need to be extracted and, if necessary, formatted in an appropriate manner. The coordinates can, however, also be derived from other information in the read data, for example, from postal addresses or other addresses of certain real locations, or from a vector description of a section of a real region.

The processing of the read data by processor 110 can deviate depending upon the various types of data sources. Program instructions 122 could for this purpose have differing sub-instructions, which are selected, for example, on the basis of a parameter, depending upon the data source. Here, for each data source its own sub-instructions can be implemented, or sub-instructions can be implemented, which can be used for various data sources of the same type. Three exemplary alternatives for the processing are illustrated in the flow charts of FIGS. 3a-3b.

Figure 3A:
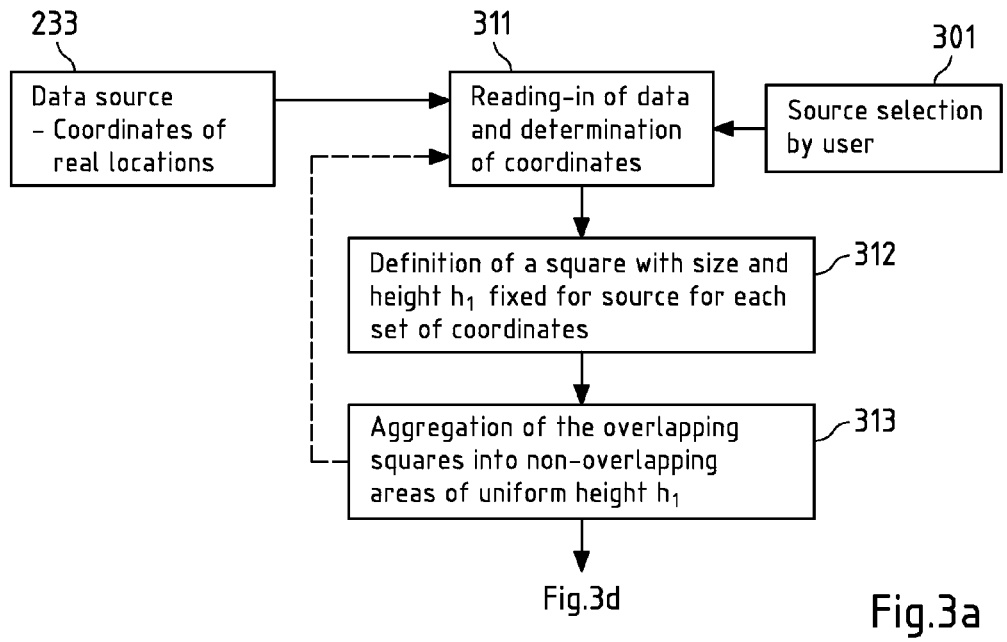
FIG. 3a is a flow chart with a first set of method steps of an exemplary embodiment of the method according to the invention.

FIG. 3a illustrates possible processing of data from a data source 233, which provides traffic congestion information. Similar processing also comes into consideration for various other data sources, such as, for example, a data source that specifies locations subject to flooding.

From the data read in from the data source 233 sets of coordinates for various real locations are determined (action 311). The data can include such coordinates from the outset, so that these simply need to be extracted. If for example there is traffic congestion on a section of road, this traffic congestion can be reflected by means of a series of sets of coordinates, which define locations at even intervals along the section of road. Alternatively such a series of sets of coordinates could be calculated from the data, if the data specify a section of road with traffic congestion in another manner, for example by means of the end points of one or a plurality of straight lines.

FIG. 4a illustrates in a very simplified manner by means of a sequence of points a sequence of locations, defined by a respective set of coordinates, which represent traffic congestion on a section of road. Dashed lines show the course of the road with a junction just for a better understanding. The read data contain no information relating to the roads per se.

An area is then defined for each set of coordinates of a real location (action 312). The area is, by way of example, a square with the location specified by the set of coordinates as its center. A square can be defined by its four corners. The size of the square can be fixed for the data source. The size can, for example, be selected such that the squares for a particular series of coordinate sets overlap. That is to say, a larger spacing selected between the locations specified by the coordinates, which locations represent traffic congestion on a section of road, could be taken into account with larger squares. A predetermined height $h_1$ is furthermore assigned as a value to the squares.

FIG. 4b illustrates in a very simplified manner the assignment of squares as exemplary areas to each set of coordinates represented in FIG. 4a. The squares are overlapping. In the interests of a better understanding the first and the last square are drawn with thicker lines.

Subsequently all overlapping areas are aggregated so that one obtains one or a plurality of non-overlapping areas (action 313). The aggregated areas have throughout the same height $h_1$ as the individual squares.

FIG. 4c illustrates in a very simplified manner a plan view onto the non-overlapping area that ensues with the step of aggregation of the squares in FIG. 4b. For the small extract represented there exists only a single non-overlapping area. It is to be understood that traffic congestion on other sections of roads result in similar non-overlapping areas. It is furthermore to be understood that a non-overlapping area in rectangular form only ensues if the traffic congestion runs exactly in the north-south direction or the west-east direction, as assumed in FIG. 4a.

FIG. 4d illustrates in a very simplified manner a perspective view onto the aggregated area, from which also the uniform height assigned to the aggregated area is visible.

Since traffic congestion data is constantly altering, the actions 311-313 could be repeated automatically at regular, short intervals, for example every 10 minutes, or at a respective request of the user.

Figure 3B:
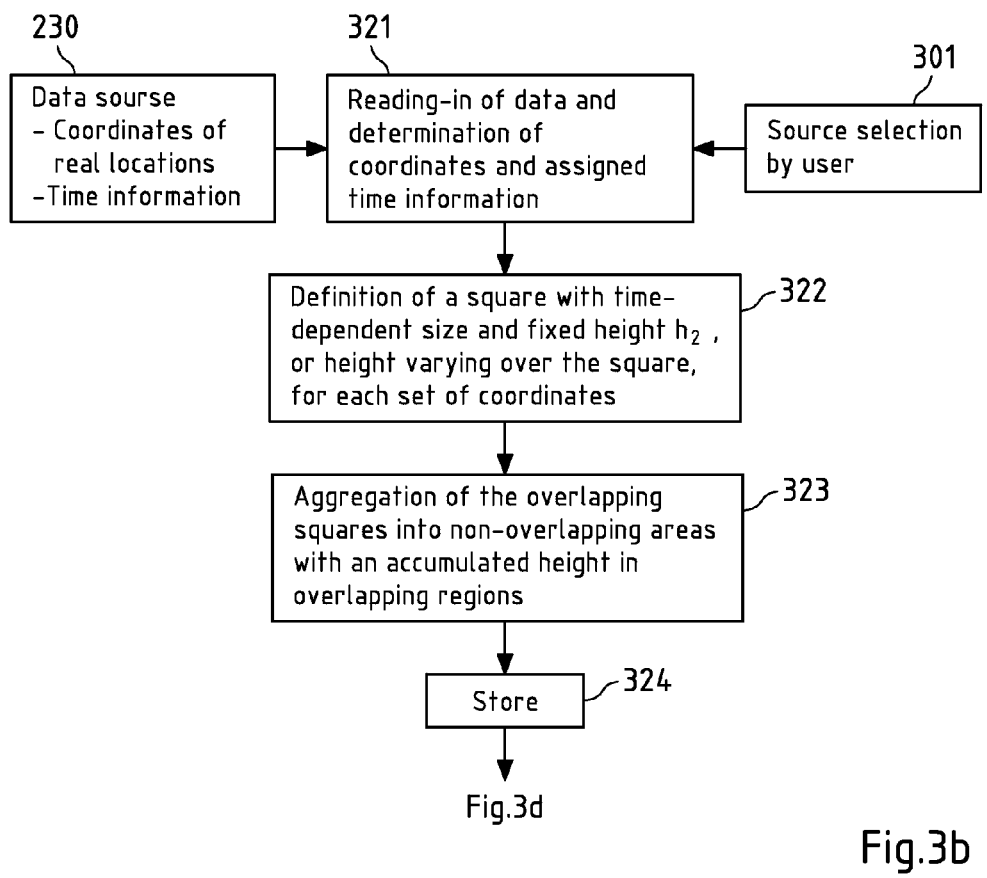
FIG. 3b is a flow chart with a second set of method steps of an exemplary embodiment of the method according to the invention.

FIG. 3b illustrates the possible processing of data from a data source 230, which provides location information relating to accidents. Similar processing also comes into consideration for various other data sources, such as, for example, a data source 231, which provides the locations of crimes.

From the data read in from the data source 230 the coordinates of various real locations are determined (action 321). The data can include a set of coordinates for each accident registered in a covered region. In addition an indication of time can be assigned to each set of coordinates in the read data, which specifies when the accident has taken place.

FIG. 5a illustrates in a very simplified manner three locations, which are defined by a respective set of coordinates at which an accident has taken place, by means of three points. The dashed lines show the course of the road with a junction for a better understanding. Here the course of the road corresponds to the course in FIG. 4a. Once again the read data contain no information concerning the roads per se. Two points are located close to one another at the junction; the third point is located at some distance from the latter.

For each set of coordinates of a real location an area is then defined with a fixed height $h_2$ as an assigned value (action 322). Once again the area is, by way of example, a square, with the location specified by the set of coordinates as its center. The size of the square can be fixed for the data source, for example with an edge length of 250 meters. In addition provision can be made for the size of the square to reduce, the longer the point in time assigned to a set of coordinates dates back in time. Alternatively or additionally, it could be that sets of coordinates with an assigned point in time, which dates back longer than a predetermined time, are not to be taken into account in the processing. Alternatively to the assignment of a uniform height $h_2$ to an overall area a height that varies over the area could also be used. Thus it could be that a height $h_2$ is only the maximum height assigned to the center of the area, wherein the center can be determined by the related set of coordinates. This maximum height could then decrease towards the edges of the area.

FIG. 5b illustrates in a very simplified manner the assignment of squares as exemplary areas to each set of coordinates represented in FIG. 5a. The two squares that are based on the coordinates for the two locations lying close to one another are overlapping. The third square, which is based on the coordinates for the third separate location, does not overlap with the other squares.

Subsequently all overlapping areas are aggregated so that one obtains one or a plurality of non-overlapping areas (action 323). In the parts that formerly overlapped, the aggregated areas have an accumulated height of the original areas. That is to say, in parts in which two squares overlap the doubled height $2h_2$ of the original squares ensues; in regions in which three squares overlap the three-fold height $3h_2$ of the original squares ensues, etc. If heights varying over the areas are assigned to the original areas, a corresponding summation of values at each position in the overlapping regions is carried out. It is to be understood that it would also be possible, for example, to provide a maximum value for the accumulated height.

FIG. 5c illustrates in a very simplified manner a plan view onto the non-overlapping areas that ensue with the step of aggregation of the squares in FIG. 5b. For the small extract represented two non-overlapping areas exist, of which the left-hand area is based on two aggregated overlapping areas. Here the full line shows the outline of the base with a first height $h_2$, and the dashed line shows a rectangle with a height $2h_2$. The right-hand non-overlapping area corresponds to the original third square with a height $h_2$. It is to be understood that accidents on other sections of the road result in similar non-overlapping areas. FIG. 5d illustrates in a very simplified manner a perspective view onto the aggregated areas.

From FIGS. 5c and 5d it can be seen that the base area of the lower part of an aggregated area from two squares can be defined with eight sets of coordinates, namely with one set for each corner. For the definition of the base area of the higher part of the aggregated areas just two additional sets of coordinates are required, since two corners coincide with those of the lower part.

Finally a definition of the resulting non-overlapping areas is stored in the main memory 140, or in another long-term memory and, if appropriate, also directly in the cache 130 (action 324).

Figure 3C:
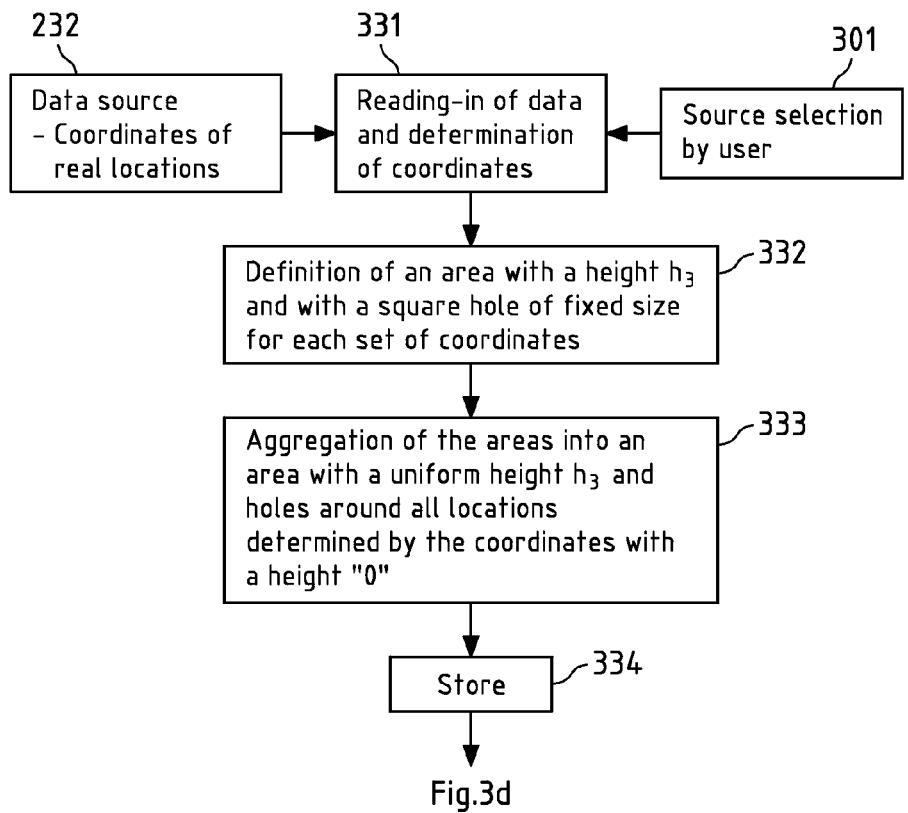
FIG. 3c is a flow chart with a third set of method steps of an exemplary embodiment of the method according to the invention.

FIG. 3c illustrates the possible processing of data from a data source 232, which delivers location information for the workshops of restorers. Alternatively it could provide location information for any other type of facility, in particular for such facilities, which on a route shall always be reachable within a certain time, or within a certain radius, for example location data for other types of workshops or petrol stations.

From the data read in from the data source 232 the coordinates of the workshops are determined (action 331).

For each set of coordinates relating to a workshop an area with a hole is then defined (action 332). The hole has, for example, the form of a square with the location specified by the coordinates as its center. The size of the square can be fixed and it can define a domain in which the location at its center can normally be reached within a certain time. The area surrounding the hole has, for example, a predetermined height $h_3$ as an assigned value. In a variant it would also be possible to configure the height of the area in a non-uniform manner. It could, for example, in general have the height $h_3$, but within a certain distance from the hole, or from the center of the hole, could begin to decrease towards "zero". The reduction of the height could, for example, take place in accordance with a linear or quadratic function. Non-constant heights for a defined area may in general rather come into consideration for data sources that provide only a few datasets, since in these cases the additional computing resource required can remain manageable.

Subsequently all areas with a hole are aggregated such that one obtains one area with a plurality of holes or one large hole, which cover the overall domain of all individual holes (action 333). The aggregated area can, for example, have the same height $h_3$ throughout as the individual areas, and the holes can, for example, have a height of "zero" throughout. For the variant with a variable height the minimum height can instead be used for each point, which height ensues for the various sets of coordinates at this point.

Figure 6:
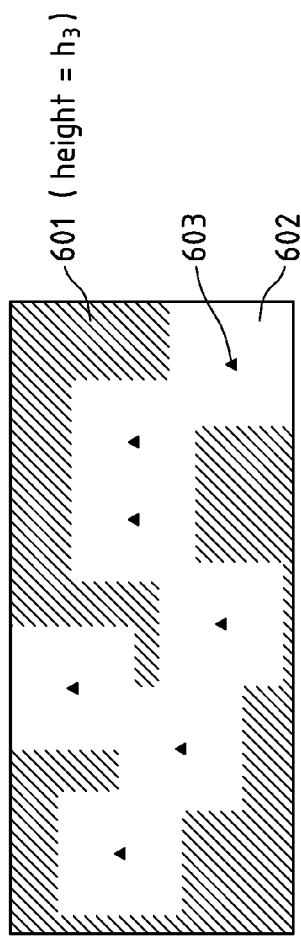
FIG. 6 is a schematic representation of an aggregation of areas of a third data source.

FIG. 6 illustrates in a greatly simplified manner a plan view onto a resulting aggregated non-overlapping area 601 with a uniform height $h_3$ and with holes 602 for all workshops. The position of the workshops is marked in each case with a triangle 603.

Finally a definition of the resulting non-overlapping areas is stored in the main memory 140, or in another long-term memory and, if appropriate, also in the cache 130 (action 334). Since provided data relating to accidents, crimes, facilities and similar are relatively static in general, the stored data can be used on multiple occasions. Due to the large quantities of data involved the computing effort can by this means be reduced significantly.

While FIGS. 3a-c illustrate three possible processing variants for three different types of data, it is to be understood that other processing variants are also possible for the same or other types of data. Furthermore an apparatus, or a program that it contains, may only support one processing variant.

In addition it is possible that the user terminal 100 provides an own data source or supplements the data that has been read in based on its own data. If for example a vehicle fleet has a plurality of vehicles with telematic functions in operation, and it is established that two of the vehicles on the same motorway are not located in a parking area and nevertheless are not moving or are driving slowly and braking, it would be possible on the basis of this information to generate own traffic congestion data. The data can then be introduced into the system by being used as a further data source. Other real-time movement data can be used in a similar manner. If for example it is furthermore known that a new restorer has recently opened his workshop, which has not yet been taken into account by the data source 232 as a result of relatively infrequent updating of this data source, then the corresponding coordinates could be entered by the user by hand so as to supplement the data read in from the data source 232 before it is processed.

Figure 3D:
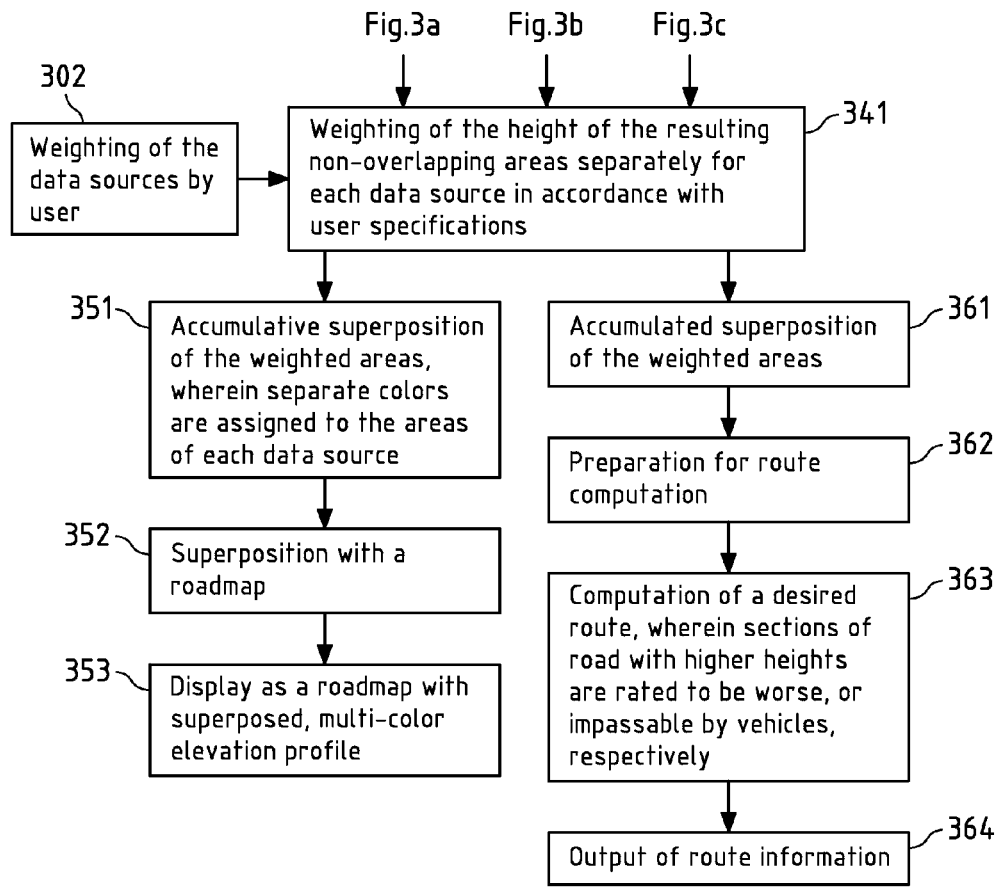
FIG. 3d is a flow chart with a fourth set of method steps of an exemplary embodiment of the method according to the invention.

FIG. 3d now illustrates an example of subsequent processing of the results of the processing illustrated in FIGS. 3a-3c. Here the data upgraded in accordance with FIG. 3a are further processed directly, while the data upgraded in accordance with FIGS. 3b and 3c are read out of the main memory 140, in which they may have only just been stored, or possibly some time in advance. If the data are present in the cache 130, then they can also be read out directly from the latter. It is to be understood that both the data upgraded in accordance with FIG. 3a and also the data upgraded in accordance with FIGS. 3b and 3c can be intermediately stored in a working memory or another memory for processing in accordance with FIG. 3d.

Firstly, and also separately for each data source, a weighting of the height of the non-overlapping areas is carried out (action 341). Here the weighting is carried out in accordance with the user specifications for each data source.

For the further processing two exemplary alternatives are presented.

For the first alternative the weighted areas for the various data sources are cumulatively superposed (action 351). That is to say, if at a point a weighted area of a first data source has the height "$a*h_1$", the weighted area of a second data source at this point has the height "$2*b*h_2$", and the weighted areas of a third data source at the point have a hole, then the overall height at this point is "$a*h_1+2*b*h_2$". Thus overall as a result of the superposition a value distribution ensues in the form of a three-dimensional elevation profile, which reflects an overall situation with regard to at least two aspects in a real region.

For the superposition each data source can be allocated its own color or its own pattern. As a result in the ensuing three-dimensional profile it can still be seen to which data source the individual elevations can be traced back.

Figure 7:
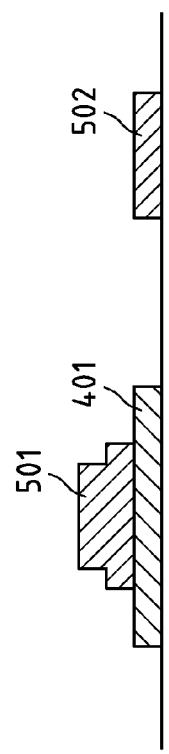
FIG. 7 is a schematic representation of an exemplary superposition of the areas from FIGS. 4d and 5d.

FIG. 7 shows in a greatly simplified manner a section through an elevation profile along the road indicated in FIGS. 4a and 5a, which ensues from the superposition of the non-overlapping areas from FIG. 4d and FIG. 5d. Here element 401 with a first form of hatching corresponds to the area with assigned height from FIG. 4d, and elements 501 and 502 with a second form of hatching correspond to the areas with assigned heights from FIG. 5d.

The ensuing three-dimensional profile can then be superposed onto a roadmap (action 352). The processor 110 can, for example, load the data for the roadmap from the main memory 140.

Finally the processor 110 can cause the presentation of the data thus upgraded on a display 170.

Figure 8:
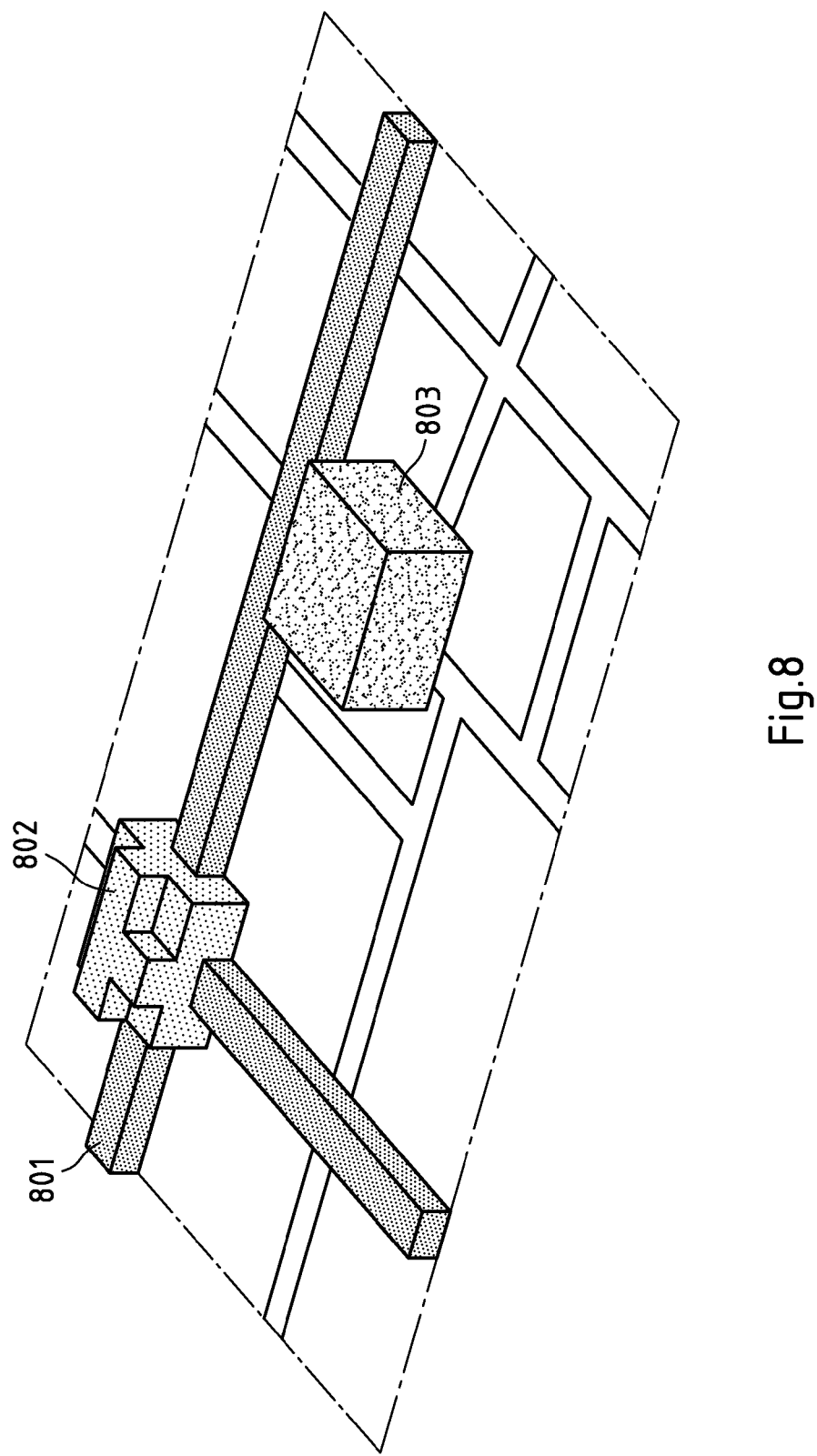
FIG. 8 is a schematic representation of an exemplary three-dimensional elevation profile for an output onto a screen.

FIG. 8 illustrates in a greatly simplified manner a small extract from such a presentation. A roadmap is represented in a plane with height "zero". In a superposed elevation profile a first pattern 801 shows regions of traffic congestion, a second pattern 802 shows an accident-prone region and a third pattern 803 shows a region at risk of crime. Here the traffic congestion regions have a relatively low height, since the user has allocated a relatively small weighting to the traffic congestion data. The accident-prone region has a medium height, since on the one hand a medium number of accidents have been registered at the junction concerned, and since on the other hand the user has allocated a medium weighting to the accident data. However, the height of the accident-prone region partially overlaps the height caused by traffic congestion in the region of the junction concerned so as to form a relatively high overall height. The region at risk of crime has a relatively high height by virtue of a multitude of registered crimes in its center, and also by virtue of a high weighting allocated to the crime data by the user.

On the basis of the clear presentation the user can now plan a route manually such that it always runs at the lowest possible level through the valleys in the three-dimensional "mountains".

In the first alternative in FIG. 3d the actions from FIG. 3a and actions 341, 351, 352 and 353 can be always repeated when the user requires an update. To this end the actions from FIGS. 3b and 3c do not need to be executed once again. For the accident and/or crime data and for the restorer data the data previously stored in the cache 130 can be reused on multiple occasions, for example until the program is restarted.

For the second alternative the weighted areas for the various data sources are likewise cumulatively superposed so as to obtain a three-dimensional elevation profile (action 361).

The assignment of dedicated colors or patterns to the elevations based on various data sources is in this case only necessary if the second alternative is to be used in combination with the first alternative.

The result from action 361 is made available for an automatic route computation (action 362).

The processor 110 can now execute a route computation, in that it executes program instructions for a route computation (action 363). The program instructions for a route computation can be integrated into program 121, or they can be held in an independent program in the storage medium 120.

The route computation is based on road data stored in the main memory 140. In addition to a conventional computation of, for example, the shortest or quickest route, the route computation takes into account the three-dimensional elevation profile. In particular sections of road with high heights in the three-dimensional profile can be rated to be worse than sections of road with lower heights. From a predetermined height upwards sections of road can also be assessed as sections that cannot be traversed by pedestrians or motorists. Thus, for example, the height $h_3$ for the actions described with reference to FIG. 3c can be defined such that the only such routes are computed that move continuously through a valley defined by the holes. This effect can be softened if the user reduces the influence of data source 232 in the weightings to a sufficient extent. In general, the safest route can be determined in this way if the data sources have, for example, been selected and weighted accordingly by the user.

Provision can also be made for the user to be able to define an individual limiting value for the height for each aspect, and/or a limiting value for the aggregated height of all aspects, which may not then be exceeded on a route.

Processor 110 then causes an output of the route information via the output unit 170 (action 364). The output can take place in any optical and/or acoustical manner.

One possible result of the route computation can also be that a route with the specified criteria is not available. If one of the criteria was not essential the user can then causes a reanalysis with altered weightings for the data sources.

In the second alternative in FIG. 3d the actions 341, 361, 362, 363 and 364 can moreover always be repeated when the actions from FIG. 3a provide new results for the traffic congestion data. As accident and/or crime data, and as restorer data, the data previously stored in the cache 130 can once again be reused.

It is to be understood that the first and the second alternatives can also be combined. Processor 110 can therefore carry out an automatic route computation taking into account the three-dimensional profile, and the computed route can then be presented to the user on a roadmap, for example, overlaid with the three-dimensional profile.

In addition to the actions described with reference to FIGS. 3a-3d at least one normalization of the data could also be executed. On the one hand the data read in from certain data sources could be normalized directly after the reading procedure. If, for example, the read data itself delivers information concerning the heights or other values allocated to the areas, then the data can be normalized such that the values are in a proper relationship with the values for other data sources. In general the data from various data sources can also be brought into a uniform structure by means of a normalization procedure. In some embodiments provision can be made for data also to be allowed to be qualitatively improved at this, for example by the combination of data, or the apportioning of data, by an augmentation with other data, etc. Alternatively or additionally the areas and/or the values assigned, or to be assigned, to the areas could be normalized. Hereby, for example, in case a large number of data sources have been taken into account, it can be ensured that clarity remains preserved in that smaller areas and/or values are used than in a case in which a small number of data sources have been taken into account.

It is to be understood that the apparatus 100 also supports the option that a user only selects a single data source in action 301. In this case the cumulative superposition in action 351 or 361 can be omitted. A weighting of the data in accordance with action 302 in this case is also not absolutely essential. Even with a single data source already a clear elevation profile with multi-level heights can ensue, if new heights ensue from the aggregation of the overlapping areas, as is the case, for example, in action 323 from FIG. 3b, or if varying heights, and/or heights that are not constant over an area, are already assigned to the defined areas, which heights ensue from additional information in the read data.

It is further to be understood that all the actions presented do not necessarily need to be caused by the processor 110 in the apparatus 100.

For example, some of the actions, for example the actions in FIGS. 3a-3c, could be executed by the server 260. From this a plurality of advantages can ensue. Some of the computing-intensive operations could then be carried out once only for a multitude of users. In a particular user apparatus 100 only the individual processing based on user specifications could take place in accordance with the actions described with reference to FIG. 3d. Moreover on a server 260, central access to a growing number of data sources available can be enabled for a multitude of users. In a further alternative all actions described with reference to FIGS. 3a-3d could be executed in the server 260, except for the output of information by means of the output unit 170. In this manner the computing power required for the invention in a user terminal can be reduced.

In another embodiment all the actions described with reference to FIGS. 3a-3d could be executed on the PC 220, be it for manual route planning, or be it for a route computation as advance information before a journey. In addition such a PC 220, or a company's own server in a vehicle fleet, could be used for the purpose of processing the data for a multitude of vehicles in the vehicle fleet in a resource preserving manner. Routes that have been fully computed, or intermediate results, could then be transmitted, for example via a local wireless network (Wireless Local Area Network WLAN), to each vehicle for use.

The connections between components represented or described are to be understood as functional connections. They can be implemented directly or indirectly via a plurality of other components. The sequence of actions as depicted in the individual flow chart is not essential; alternative sequences for the steps in the method are conceivable. The actions can be implemented in a different manner, thus implementation is not only conceivable in software (by means of program instructions), but also purely in hardware, or in an aggregation of both.

It is to be understood that the embodiments described are just examples, which can be modified and/or supplemented in the context of the claims in a variety of ways. In particular each feature that has been described for a certain exemplary embodiment can be used independently or in combination with other features in any other exemplary embodiment. Each feature that has been described for an exemplary embodiment of a certain category can also be deployed in a corresponding manner in an exemplary embodiment of another category.

What is claimed is:

1. A method for upgrading location-related data, the method comprising:
   reading data, by a processor, from at least two data sources, wherein on a basis of the data of each of the at least two data sources sets of coordinates of real locations relevant for a respective aspect can be determined;
   defining, by the processor, an area based on a set of coordinates for each of the real locations for each of the at least two data sources, and determining at least one value assigned to the area;
   for each of the at least two data sources, aggregating overlapping areas defined for the data source so as to obtain non-overlapping areas with at least one assigned value for each of the at least two data sources; and
   superposing, by the processor, the non-overlapping areas with the assigned values, which are based on the data from the at least two data sources, so as to obtain a value distribution, which reflects an overall situation with regard to at least two aspects in a real region, wherein the at least two aspects relate to at least one of safety and mobility.

2. The method according to claim 1, wherein the area defined for a respective set of coordinates for the at least two data sources is a square, a circle, or a polygon.

3. The method according to claim 1, wherein a size and/or the at least one value of the area defined for a respective set of coordinates for the at least two data sources has at least one predetermined value, and/or is based on information in the data read from the at least two data sources.

4. The method according to claim 1, wherein the at least one value, which is assigned to an area defined for a respective set of coordinates, for the at least two the data sources
   is a uniform value for the area, or
   is a value that varies over the area, or
   comprises a maximum value, which is assigned to at least one center of the area corresponding to the set of coordinates, and further values, which are assigned to the area such that the further values become smaller with increasing distance from the center of the area, either continuously or in stages, or
   comprises a plurality of values, which are assigned to the area such that with increasing distance from the real location defined by the set of coordinates, the values become larger either continuously or in stages at least up to a maximum value.

5. The method according to claim 1, wherein a point in time is assigned to at least one of the sets of coordinates that can be determined from the data of the at least two data sources, and wherein a size and/or the assigned value of the area for the at least one set of coordinates is determined as a function of the point in time indicated for the at least one set of coordinates.

6. The method according to claim 1, wherein in the course of the aggregation of the areas for at least one of the at least two data sources a uniform value is assigned to all non-overlapping areas.

7. The method according to claim 1, wherein in the course of the aggregation of the areas for at least one of the at least two data sources the values assigned to the defined areas are accumulated in overlapping parts of the defined areas.

8. The method according to claim 1, wherein for at least one of the data sources for each set of coordinates an area with an assigned value is defined, which area has a hole around the location defined by the set of coordinates, and wherein the aggregation for the at least one of the data sources results in a non-overlapping area with holes around all locations defined by the sets of coordinates.

9. The method according to claim 1, further comprising:
   detecting a user input, which specifies a weighting for the at least two data sources; and
   using the specified weightings for an adjustment of an influence of the at least two data sources on the value distribution.

10. The method according to claim 9, wherein a use of the specified weightings for the adjustment of the influence of the at least two data sources on the value distribution comprises:
    weighting the values assigned to the non-overlapping areas for each of the at least two data sources in accordance with the specified weighting before the superposition of the non-overlapping areas; or
    determining the values of the defined areas for each of the at least two data sources taking into account the specified weighting.

11. The method according to claim 1, furthermore comprising storing data relating to the non-overlapping areas and the assigned values for the at least two data sources as a basis for a repeated superposition.

12. The method according to claim 1, wherein the at least two data sources comprise at least one of the following:
    a data source, which provides data, from which sets of coordinates can be determined for locations relating to a least one type of event or incident;
    a data source, which provides data, from which sets of coordinates can be determined for locations relating to at least one type of local circumstance;
    a data source, which provides data, from which sets of coordinates can be determined for locations of at least one type of local situation; and
    a data source, which provides data, from which sets of coordinates can be determined for a particular type of facility.

13. The method according to claim 1, further comprising at least one of the following steps:
    presenting a three-dimensional profile illustrating the value distribution by means of a display unit;
    presenting a three-dimensional profile illustrating the value distribution together with a road network by means of a display unit;
    providing the value distribution for a route computation; and
    carrying out a route computation taking into account the value distribution.

14. An apparatus for upgrading location-related data comprising a non-transitory computer-readable storage medium having instructions therein, that when executed by a computing device, cause the computing device to perform the following:
    read data from at least two data sources, wherein on a basis of the data of each of the at least two data sources sets of coordinates of real locations relevant for a respective aspect can be determined;
    define an area based on a set of coordinates for each of the real locations for each of the at least two data sources, and determining at least one value assigned to the area;
    for each of the at least two data sources, aggregate overlapping areas defined for a data source so as to obtain non-overlapping areas with at least one assigned value for each of the at least two data sources; and superpose the non-overlapping areas with the assigned values, which are based on the data from the at least two data sources, so as to obtain a value distribution, which reflects an overall situation with regard to at least two aspects in a real region, wherein the at least two aspects relate to at least one of safety and mobility.

15. The apparatus according to claim 14, wherein the area defined for a respective set of coordinates for at least one of the data sources is a square, a circle, or a polygon.

16. The apparatus according to claim 14, wherein a size and/or the at least one assigned value of the area defined for the respective set of coordinates for the at least two data sources has at least one predetermined value, and/or is based on information in the data read from the at least two data sources.

17. The apparatus according to claim 14, wherein the at least one assigned value, which is assigned to an area defined for a respective set of coordinates, for the at least two data sources:
    is a uniform value for the area, or
    is a value that varies over the area, or
    comprises a maximum value, which is assigned to at least one center of the area corresponding to the set of coordinates, and further values, which are assigned to the area such that the further values become smaller with increasing distance from the at least one center of the area, either continuously or in stages, or
    comprises a plurality of values, which are assigned to the area such that with increasing distance from the real location defined by the set of coordinates, the values become larger either continuously or in stages at least up to a maximum value.

18. The apparatus according to claim 14, wherein the apparatus assigns a point in time to at least one of the sets of coordinates that can be determined from the data of the at least two data sources, wherein a size and/or the assigned value of the area for the at least one set of coordinates is determined as a function of the point in time indicated for the at least one set of coordinates.

19. The apparatus according to claim 14, wherein the apparatus, in a course of the aggregation of the areas for at least one of the at least two data sources, assigns a uniform value to all non-overlapping areas.

20. The apparatus according to claim 14, wherein the at least one memory and the at least one program are configured, together with the at least one processor, to cause the apparatus to, in the course of the aggregation of the areas for at least one of the at least two data sources, accumulate the values assigned to the defined areas in overlapping parts of the defined areas.

21. The apparatus according to claim 14, wherein the apparatus defines the at least two data sources for each set of coordinates a respective area with an assigned value, which the area has a hole around the real location defined by the sets of coordinates, and wherein the aggregation for the at least one of the two data sources results in a non-overlapping area with holes around the real locations defined by the sets of coordinates.

22. The apparatus according to claim 14, wherein the apparatus further performs the following:
    detect a user input, which specifies a weighting for the at least two data sources; and
    use the specified weightings for an adjustment of an influence of the at least two data sources on the value distribution.

23. The apparatus according to claim 22, wherein the use of the specified weightings for the adjustment of the influence of the at least two data sources on the value distribution comprises:
    weighting the values assigned to the non-overlapping areas for each of the at least two data sources in accordance with the specified weighting before the superposition of the non-overlapping areas; or
    determining the values of the defined areas for each of the at least two data sources taking into account the specified weighting.

24. The apparatus according to claim 14, wherein the at least one memory and the at least one program are furthermore configured, together with the at least one processor, to cause the apparatus to store data relating to the non-overlapping areas and the assigned values for the at least two data sources as a basis for a repeated superposition.

25. The apparatus according to claim 14, wherein the at least two data sources comprise at least one of the following:
    a data source, which provides data, from which sets of coordinates can be determined for locations relating to a least one type of event or incident;
    a data source, which provides data, from which sets of coordinates can be determined for locations relating to at least one type of local circumstance;
    a data source, which provides data, from which sets of coordinates can be determined for locations of at least one type of local situation; and
    a data source, which provides data, from which sets of coordinates can be determined for a particular type of facility.

26. The apparatus according to claim 14, wherein the non-transitory computer-readable storage medium having instructions therein, that when executed by a computing device, cause the computing device to additionally execute at least one of the following:
    present a three-dimensional profile illustrating the value distribution by means of a display unit;
    present a three-dimensional profile illustrating the value distribution together with a road network by means of a display unit;
    provide the value distribution for a route computation; and
    carry out a route computation taking into account the value distribution.

27. A non-transitory computer-readable storage medium having instructions therein, that when executed by a computing device, cause the computing device to perform the following:
    read data from at least two data sources, wherein on a basis of the data of each of the at least two data sources sets of coordinates of real locations relevant for a respective aspect can be determined;
    define an area based on a set of coordinates for each of the real locations for each of the at least two data sources, and determining at least one value assigned to the area;
    for each of the at least two data sources, aggregate overlapping areas defined for the data source so as to obtain non-overlapping areas with at least one assigned value for each of the at least two data sources; and
    superpose the non-overlapping areas with the assigned values, which are based on the data from the at least two data sources, so as to obtain a value distribution, which reflects an overall situation with regard to the at least two aspects in a region, wherein the at least two aspects relate to at least one of safety and mobility.

* * * * *